(12) United States Patent
Yu

(10) Patent No.: US 8,694,155 B2
(45) Date of Patent: Apr. 8, 2014

(54) SYSTEM FOR AUTO-EXCHANGING OF ELECTRIC VEHICLE BATTERY

(75) Inventor: Chi-Man Yu, Bucheon-si (KR)

(73) Assignees: Motex Products Co., Ltd., Bucheon-Si, Gyeonggi-Do (KR); Kookmin Univ. Industry Academy Cooperation Foundation, Seoul (KR); Industry-Univ. Cooperation Foundation of Korea Aerospace Univ., Goyang-Si, Gyeonggi-Do (KR)

( * ) Notice: Subject to any disclaimer, the term of this patent is extended or adjusted under 35 U.S.C. 154(b) by 42 days.

(21) Appl. No.: 13/533,194

(22) Filed: Jun. 26, 2012

(65) Prior Publication Data

US 2013/0343842 A1 Dec. 26, 2013

(51) Int. Cl.
*G06F 7/00* (2006.01)
*H02J 7/00* (2006.01)
*B65G 1/00* (2006.01)

(52) U.S. Cl.
USPC ........... 700/228; 700/230; 700/213; 700/218; 320/109; 414/279

(58) Field of Classification Search
None
See application file for complete search history.

(56) References Cited

U.S. PATENT DOCUMENTS

2011/0251935 A1* 10/2011 German et al. ................. 705/30
2012/0068664 A1* 3/2012 Franzen et al. ............... 320/109

* cited by examiner

*Primary Examiner* — Yolanda Cumbess
(74) *Attorney, Agent, or Firm* — Sherr & Jiang, PLLC

(57) ABSTRACT

A system for automatically exchanging a battery of an electric vehicle, including a horizontal frame of a predetermined area formed at a location higher than the electric vehicle; a plurality of battery stands formed on a bottom surface of the horizontal frame at a predetermined interval; a pair of fixed guide rails arranged and installed on front and rear sides or left and right sides of the horizontal frame, respectively; a variable guide rail adapted to move horizontally along X-axis or Y-axis along the fixed guide rails; a movable rail adapted to move horizontally along Y-axis or X-axis along the variable guide rail and ascend/descend vertically; and a grasping part installed on a lower end of the movable rail and adapted to pick up a battery of the electric vehicle or a battery seated on the battery stand and exchange each other.

12 Claims, 11 Drawing Sheets

SYSTEM FOR AUTO-EXCHANGING OF ELECTRIC VEHICLE BATTERY

TECHNICAL FIELD

The present invention relates to a system for automatically exchanging electric vehicle batteries, and more particularly, to a system adapted to recognize the entrance of an electric vehicle and automatically exchange a nearly discharged battery with a fully charged battery.

BACKGROUND ART

In general, vehicles commonly use, as their fuel, petroleum (e.g. gasoline, light oil) and gases (e.g. LPG, LNG), the deposits of which are limited, the prices of which are on the rise, and which cause environmental contamination. Therefore, there has been an increasing demand for alternative fuels.

Electric batteries have recently been commercialized to a considerable extent as alternative vehicle fuels, but they need to be charged for a long period of time, which degrades efficiency and makes their widespread use difficult.

DISCLOSURE

Technical Problem

Therefore, the present invention has been made in view of the above-mentioned problems, and an aspect of the present invention is to provide a system for automatically exchanging electric vehicle batteries so that, instead of charging electric vehicle batteries for a long period of time, a nearly discharged battery is conveniently and automatically exchanged with a fully-charged battery within a short period of time.

Another aspect of the present invention is to provide a system for automatically exchanging electric vehicle batteries so that, in the case of a bus, a nearly discharged battery is conveniently exchanged with a fully-charged battery at an exchange station (e.g. a specific bus stop) within a short period of time, thereby maximizing efficiency.

Technical Solution

In accordance with an aspect of the present invention, there is provided a system for automatically exchanging a battery of an electric vehicle, an electric battery being mounted on a side of an upper portion of the vehicle, the system including a horizontal frame of a predetermined area formed at a location higher than the electric vehicle; a plurality of battery stands formed on a bottom surface of the horizontal frame at a predetermined interval; a pair of fixed guide rails arranged and installed on front and rear sides or left and right sides of the horizontal frame, respectively; a variable guide rail adapted to move horizontally along X-axis or Y-axis along the fixed guide rails; a movable rail adapted to move horizontally along Y-axis or X-axis along the variable guide rail and ascend/descend vertically; and a grasping means installed on a lower end of the movable rail and adapted to pick up a battery of the electric vehicle or a battery seated on the battery stand and exchange each other.

Preferably, when there are n battery stands, at least (n−1) discharged batteries or fully-charged batteries are seated on the battery stands.

In accordance with another aspect of the present invention, there is provided a system for automatically exchanging a battery of an electric vehicle, an electric battery being mounted on a side of an upper portion of the vehicle, the system including a loader formed at a location higher than the electric vehicle, the loader having loading space units of multiple tiers and multiple columns; battery stands arranged on respective loading space units of the loader and adapted to move horizontally to a loading space unit of a different column; a pair of fixed guide rails arranged and installed on front and rear sides or left and right sides, respectively, with regard to an upper portion of the loader and the upper portion of the electric vehicle; a variable guide rail adapted to move horizontally along X-axis or Y-axis along the fixed guide rails; a movable rail adapted to move horizontally along Y-axis or X-axis along the variable guide rail and ascend/descend vertically; and a grasping means installed on a lower end of the movable rail and adapted to pick up a battery of the electric vehicle or a battery transferred to the upper portion of the loader and exchange each other.

Preferably, the loader has loading space units of multiple tiers and three columns, the loading space units of the center column have upward/downward openings so that a lifting/lowering rod ascends/descends upwards/downwards through the openings, and battery stands loaded with fully-charged batteries are arranged on the loading space units of the left and right columns, which are positioned on both sides of the loading space units of the center column, and adapted to slide horizontally.

Preferably, through-holes are formed on the battery stands so that the lifting/lowering rod can pass.

Preferably, a receiving space unit is formed near a lowest one of the loading space units of the left or right column so that a battery stand loaded with a fully-charged battery or a discharged battery is received in a loading space unit of the loader.

Preferably, the system further includes a stop monitoring sensor unit adapted to sense whether the electric vehicle has stopped at a stop line or not; an image sensing device adapted to sense whether a battery mounting recess is positioned in a movement area of the movable rail when the electric vehicle stopped and sense in what range the battery mounting recess is positioned from an absolute position of the movable rail; and a control unit adapted to apply an operating signal to drive the variable guide rail and the movable rail, based on a sensing signal from the image sensing device, so that the grasping means of the movable rail is positioned on an identical vertical line with the battery mounting recess.

Preferably, the image sensing device includes a CCD camera adapted to take images to determine whether the battery mounting recess is in a movement area of the movable rail or not when the electric vehicle stopped; an image information processing unit adapted to receive an image signal from the CCD camera and process the image signal; a memory unit adapted to store a reference value for position correction of the movable rail; and a calculation unit adapted to calculate a position correction value based on the reference value stored in the memory unit and a stop position of the electric vehicle detected by the image information processing unit, and the control unit is adapted to apply an operating signal to the driving means, based on the position correction value calculated by the calculation unit, so as to drive positions of the variable guide rail and the movable rail from absolution positions to corrected positions.

Preferably, at least two CCD cameras are positioned diagonally to minimize errors occurring during image recognition by the image recognition device.

Preferably, each battery stand is supplied with electricity to charge a discharged battery.

Preferably, the control unit is circuit-connected to respective battery stands and adapted to determine whether a battery is seated or not, determine whether respective batteries seated on the battery stands are fully charged or not, and control the driving means of the movable rail and the variable guide rail so that a discharged battery picked up from the electric vehicle is transferred to an empty battery stand and a fully-charged battery is solely transferred to the electric vehicle.

Advantageous Effects

The system for automatically exchanging electric vehicle batteries according to the present invention is advantageous in that a nearly discharged battery, which is mounted on the battery mounting recess of an electric vehicle, is easily exchanged with one of fully-charged batteries stored on a loader, which is installed on a bus stop, for example, within a short period of time, thereby substantially improving efficiency.

MODE FOR CARRYING OUT THE INVENTION

Hereinafter, preferred embodiments of the present invention will be described in detail with reference to the accompanying drawings. It will be assumed, for convenience of description, that an electric vehicle according to embodiments of the present invention is a bus. In addition, a nearly discharged battery will be simply referred to as a discharged battery, and a battery, charging of which has been completed, will be referred to a fully-charged battery.

Figure 1:
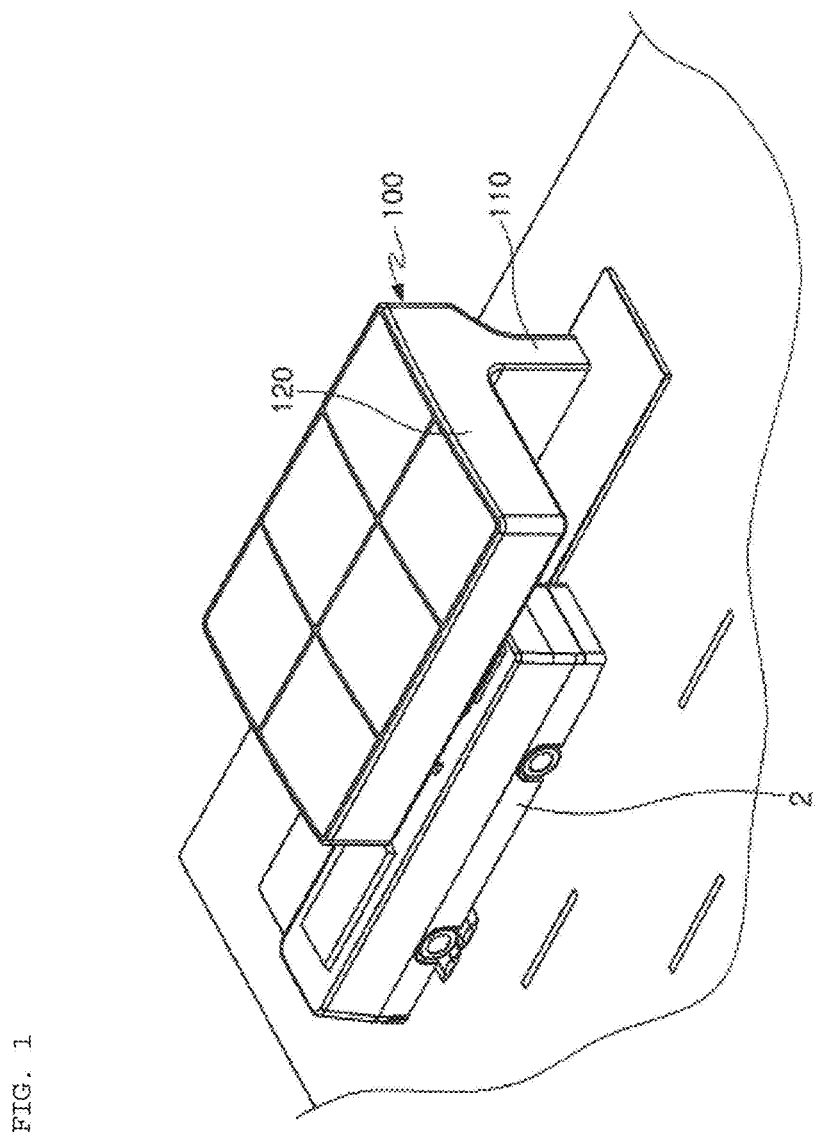
FIG. 1 is a perspective view illustrating exchange of a battery of an electric vehicle by a system for automatically exchanging electric vehicle batteries according to the present invention.
Figure 2:
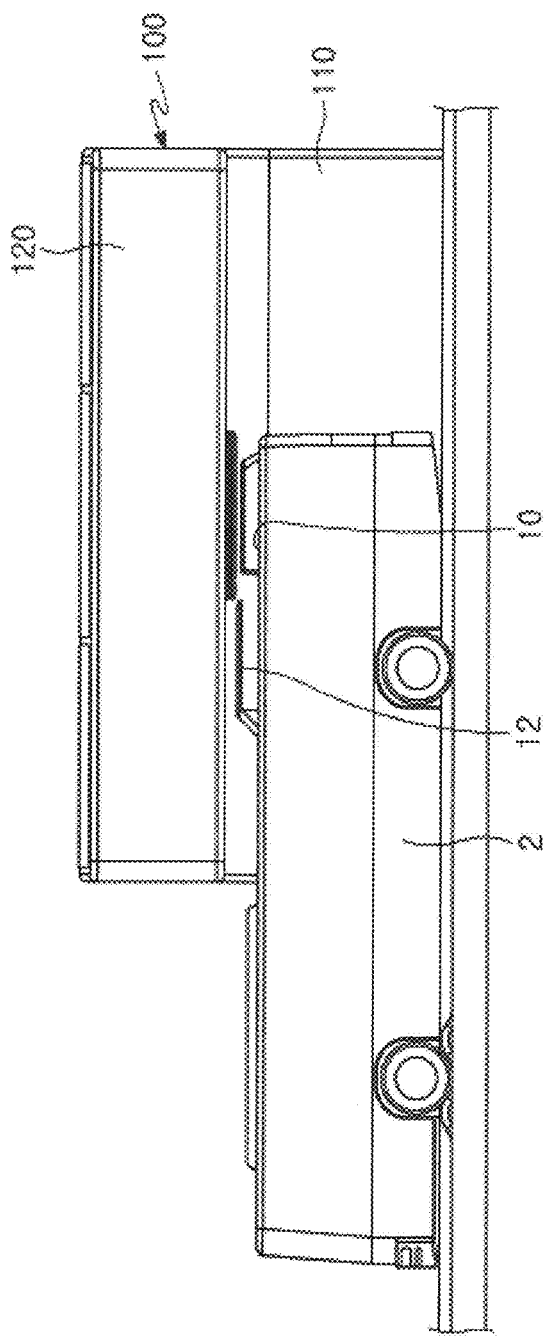
FIG. 2 is a lateral view of FIG. 1.

FIG. 1 is a perspective view illustrating exchange of a battery of an electric vehicle by a system for automatically exchanging electric vehicle batteries according to the present invention, and FIG. 2 is a lateral view of FIG. 1.

As shown in FIGS. 1 and 2, the bus 2 has an electric battery detachably mounted on the rear side of its upper frame. Particularly, a battery mounting recess 10 is formed on the rear side of the upper frame of the bus 2 to mount an electric battery and is adapted to be opened or closed by an opening/closing door 12 adapted to slide forwards/backwards.

A lifting/lowering frame 100, which has a horizontal frame 120 and a vertical frame 110 in an approximately L-shaped configuration, is installed at a bus stop (or a specific battery exchange station).

The vertical frame 110 of the lifting/lowering frame 100 serves as a support extending from the bottom surface, and the horizontal frame 120 serves as a roof for protecting passengers from rain, snow, etc. as they get on and off the bus at the bus stop. Specifically, a plurality of fully-charged batteries are installed on the horizontal frame 120 so that, if necessary, a nearly discharged battery of a bus can be exchanged with a fully-charged battery.

Figure 3:
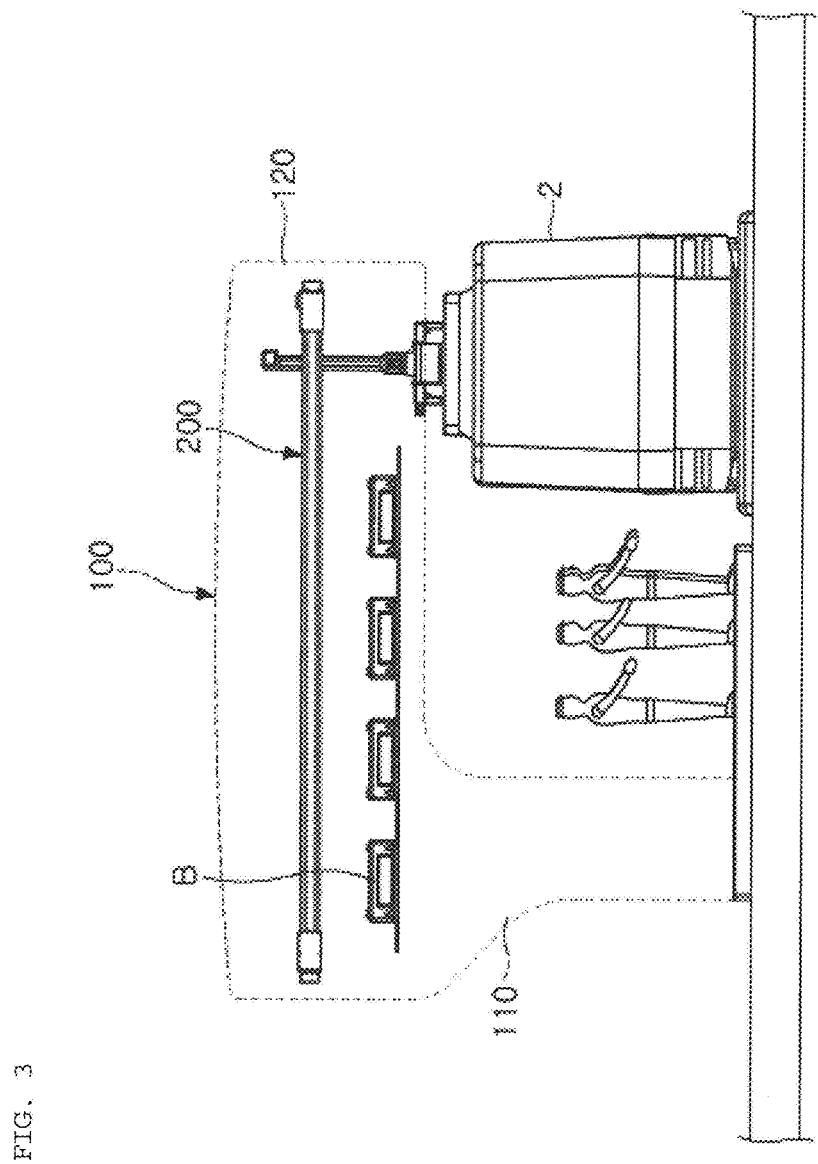
FIG. 3 is a front view of FIG. 1 according to a first embodiment of the present invention.
Figure 4:
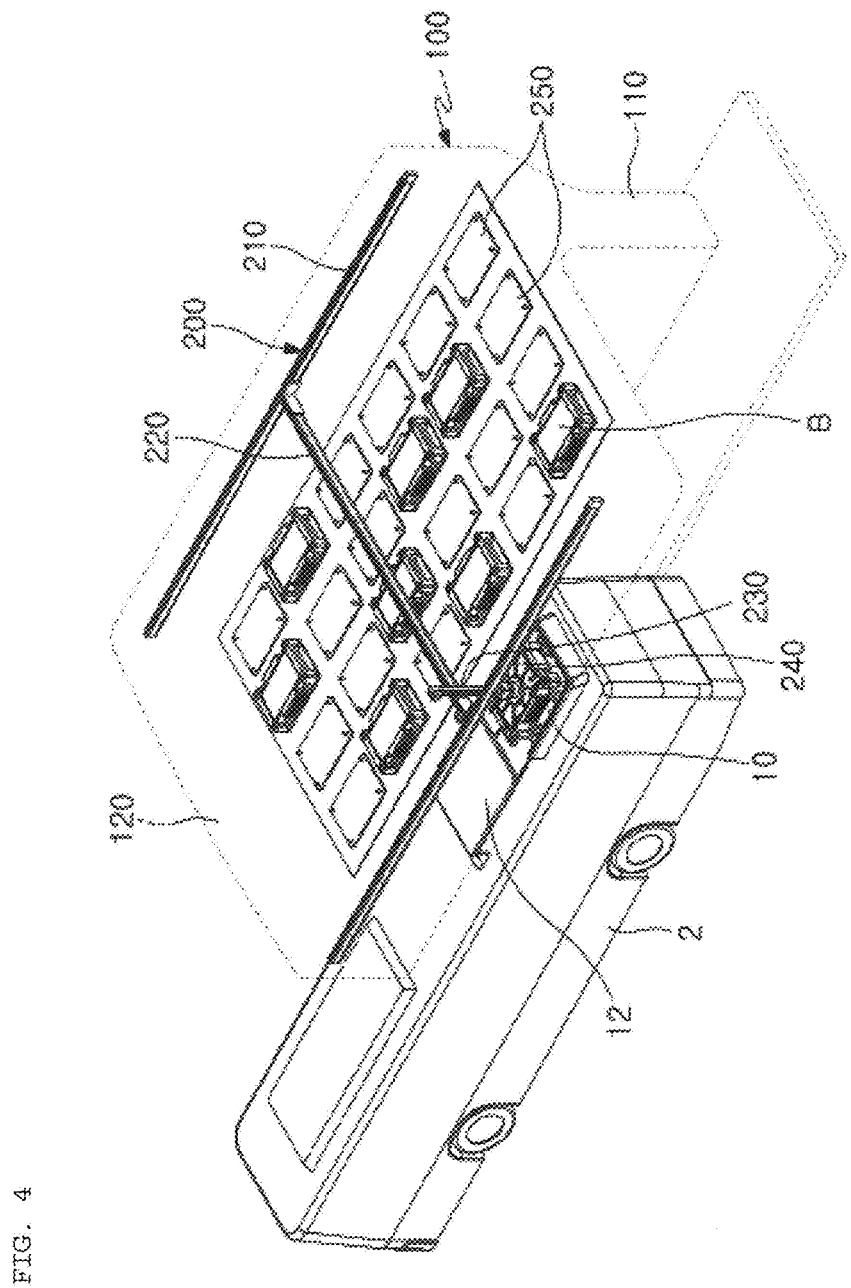
FIG. 4 illustrates internal configuration and operational relationship of a system for automatically exchanging batteries according to the first embodiment of the present invention.
Figure 5:
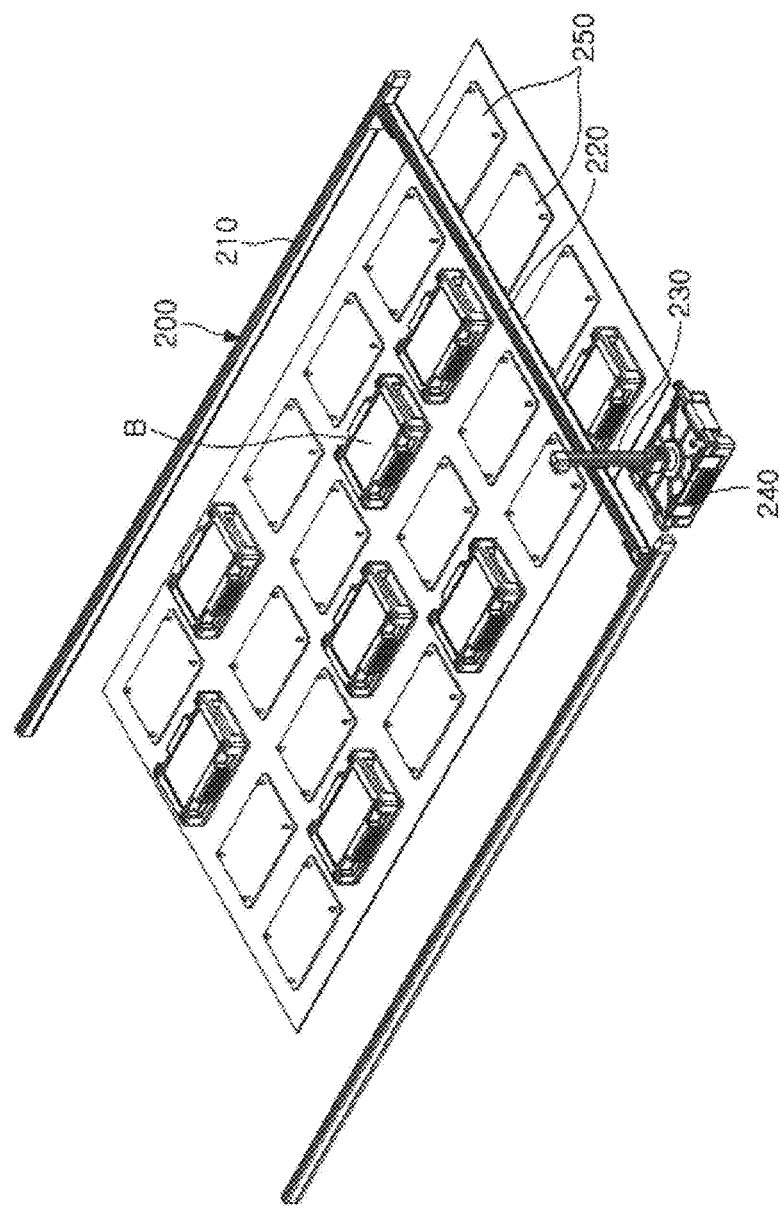
FIG. 5 is a perspective view solely magnifying the system for automatically exchanging batteries shown in FIG. 4.
Figure 6:
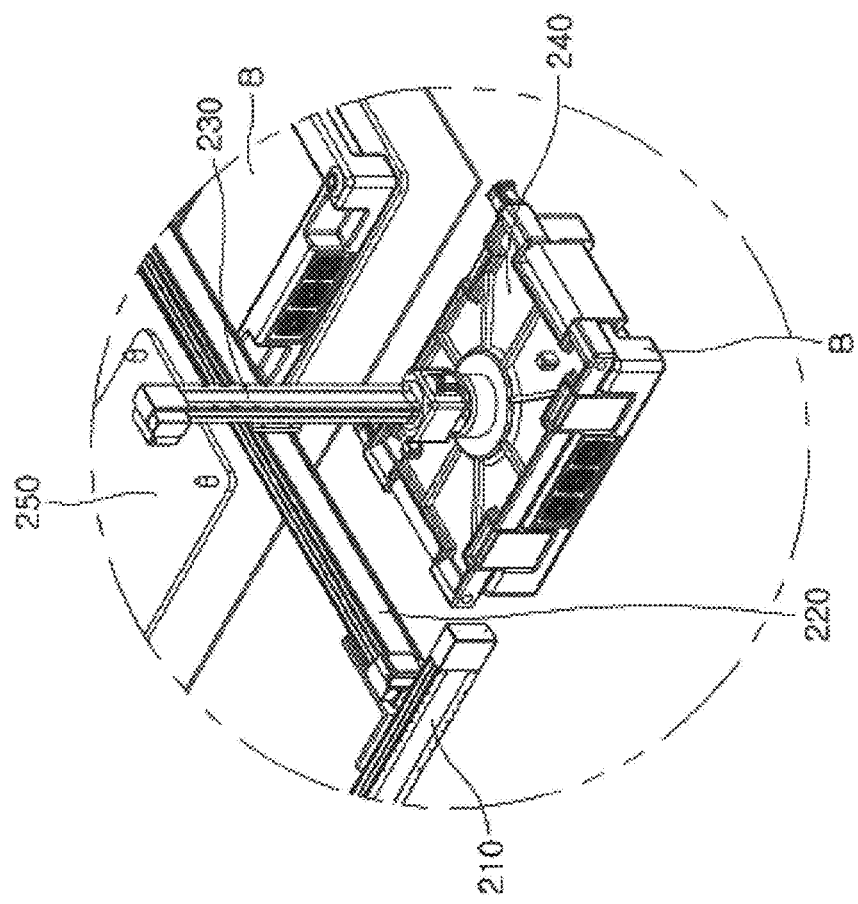
FIG. 6 is a partially magnified perspective view of FIG. 5.

FIG. 3 is a front view of FIG. 1 according to a first embodiment of the present invention; FIG. 4 illustrates internal configuration and operational relationship of a system for automatically exchanging batteries according to the first embodiment of the present invention; FIG. 5 is a perspective view solely magnifying the system for automatically exchanging batteries shown in FIG. 4; and FIG. 6 is a partially magnified perspective view of FIG. 5.

Referring to FIGS. 3-6, according to the first embodiment of the present invention, a plurality of battery stands 250 are installed throughout the entire area of the bottom surface of the horizontal frame 120, and fully-charged or discharged batteries B are detachably seated on the battery stands 250, respectively.

Assuming that there are n battery stands 250, it is preferred that not all of n battery stands 250 have batteries mounted thereon, but at least (n−1) batteries are mounted thereon.

For example, when 6 rows and 4 columns of battery stands 250 (a total of 24) are formed on the horizontal frame 120 of the lifting/lowering frame 100 as shown in FIGS. 4 and 5, it is preferred that, instead of mounting 24 batteries on the 24 battery stands 250, respectively, at least 24−1 (i.e. 23) or fewer batteries are mounted.

This is because, if every battery stand 250 has a battery mounted thereon, there is no space to mount a discharged battery, which has been picked up from a bus 2 when it entered, degrading the efficiency of the battery exchange process.

Meanwhile, fully-charged batteries are transferred by a separate loading vehicle and mounted on respective battery stands 250 of the horizontal frame 120. When all of the fully-charged batteries are exchanged with discharged batteries, the discharged batteries are exchanged with fully-charged batteries using the separate loading vehicle again.

The battery stands 250 may be supplied with electricity to charge discharged batteries mounted on the battery stands 250, instead of exchanging the discharged batteries with fully-charged batteries.

The horizontal frame 120 has a pair of fixed guide rails 210 installed on its front and rear upper portions, respectively, in parallel horizontally and a variable guide rail 220 installed to move horizontally in a transverse direction along the fixed guide rails 210.

A movable rail 230 is installed on the variable guide rail 220 in the longitudinal direction and adapted to ascend/descend with regard to the variable guide rail 220 and move horizontally in the longitudinal direction along the variable guide rail 220. A grasping means 240 is installed on a lower end of the movable rail 230 to grasp a battery B.

Reference numeral 200 in the drawings refers to the fixed guide rails 210, the variable guide rail 220, the movable rail 230, and the grasping means 240 as a whole, which constitute a battery exchange system.

Those skilled in the art can understand that, although it has been assumed in the description of the first embodiment of the present invention that a pair of fixed guide rails 210 are installed on front and rear upper portions of the horizontal frame 120, respectively, in parallel horizontally, and the variable guide rail 220 is installed in the longitudinal direction with regard to the fixed guide rails 210, it is also possible to install a pair of fixed guide rails 210 on left and right upper portions of the horizontal frame 120, respectively, in parallel and install a variable guide rail 220 in the transverse direction with regard to the fixed guide rails 210.

The system 200 for automatically exchanging electric vehicle batteries according to the first embodiment of the present invention, i.e. the horizontal frame 120 having a plurality of battery stands 250 installed thereon, the fixed guide rails 210, the variable guide rail 220, and the movable rail 230 are fixed at a specific location. However, the location of a bus 2 entering the bus stop is variable, making precise position control impossible. This means that it is very difficult to always position the grasping means 240 of the movable rail 230 on the same vertical line with a battery, which is seated on the mounting recess of the bus, according to a preset absolute position.

More specifically, a bus 2 could be stopped at a preset location along a guide stop line and positioned in an area for battery exchange, but it is impossible to stop the bus at the accurately set location (where the grasping means 240 of the movable rail 230 is set).

Therefore, it is important for the movable rail 230 to automatically find the position of the battery mounted on the battery mounting recess 10 of the bus 2 and be aligned on the same vertical line.

Figure 11:
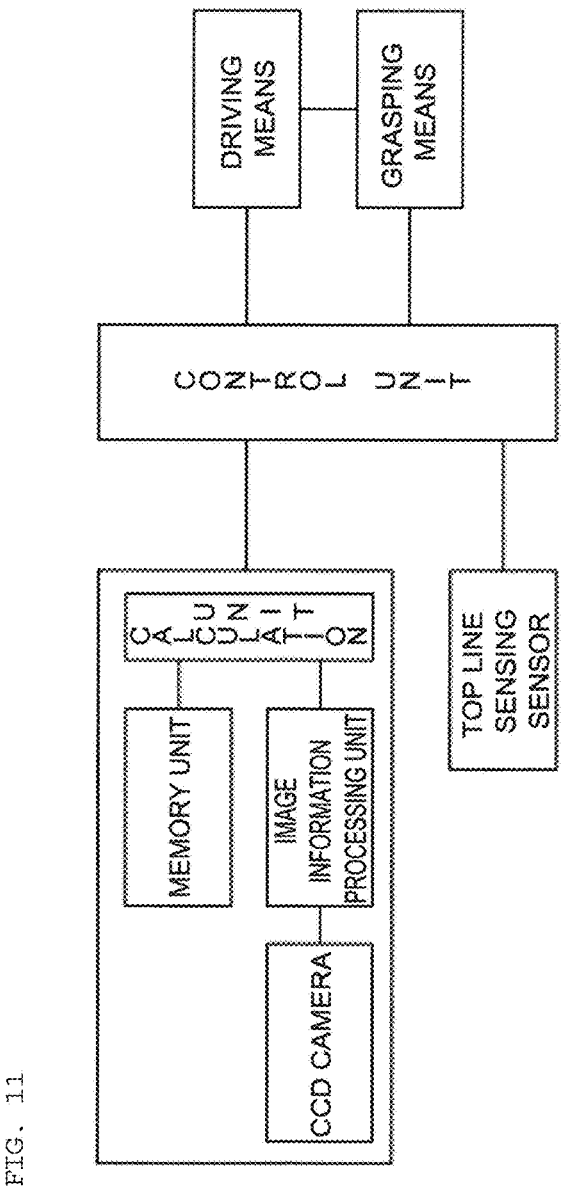
FIG. 11 is a block diagram illustrating control relationship of a system for automatically exchanging batteries according to the present invention.

Therefore, the first embodiment of the present invention employs an image recognition device, as shown in FIG. 11, to detect the positional difference between the grasping means 240 of the movable rail 230 and the battery mounted on the battery mounting recess 10 of the bus and transmit position correction data to the control unit so that, by detecting the accurate position on the same line, the grasping means 240 of the movable rail 230 is positioned on the same vertical line with the battery of the bus.

Therefore, the system includes a stop sensing sensor unit adapted to sense whether a bus has stopped at the stop line and an image sensing unit adapted to sense whether a battery mounted on the battery mounting recess 10 of a stopped bus is positioned in a movement area of the movable rail 230 and sense in what range the battery mounted on the battery mounting recess 10 is positioned from the absolute location of the movable rail 230.

The system further includes a control unit adapted to apply an operating signal to a driving means, which is adapted to drive the variable guide rail 220 and the movable rail 230, in response to a sensing signal from the image sensing unit so that the grasping means 240 of the movable rail 230 is positioned on the same vertical line with the battery mounting recess 10.

The control unit is circuit-connected to respective battery stands 250 to determine whether batteries are seated thereon or not and determine whether batteries seated on the battery stands 250 are fully charged or not.

The control unit is also adapted to control the driving means of the variable guide rail 220 and the movable rail 230 so that a discharged battery picked up from an electric vehicle (bus) is transferred to an empty battery stand 250 and only a fully-charged battery is transferred to the electric vehicle.

The image sensing unit includes a CCD camera adapted to take pictures to determine whether the battery mounting recess 10 of a stopped bus is positioned in the movement area of the movable rail 230; an image information processing unit adapted to receive image signals from the CCD camera and process the signals; a memory unit adapted to store reference values for position correction; and a calculation unit adapted to calculate a position correction value based on the reference values stored in the memory unit and the position of the stopped bus detected by the image information processing unit. Based on the position correction value calculated by the calculation unit, the control unit applies an operating signal to the driving means to drive the positions of the variable guide rail 220 and the movable rail 230 from absolute positions to corrected positions.

It is to be noted that, in order to minimize errors occurring when images are recognized by the image recognition device, at least two CCD cameras are preferably arranged diagonally so that data extracted from respective CCD cameras is compared to calculate position data, and the memory unit has preset absolute positions stored therein.

The operational relationship regarding the system for automatically exchanging electric vehicle batteries according to the first embodiment of the present invention, which has the above-mentioned construction, will now be described.

When a bus 2 enters into a bus stop, while fully-charged batteries or fully-charged and discharged batteries are mounted on the battery stands 250 of the horizontal frame 120, and inputs a signal for battery exchange, a process of exchanging the discharged battery with a fully-charged battery begins.

To be more specific, the bus 2 enters into the bus stop and stops along the stop line. The bus then inputs a battery exchange signal and opens the opening/closing cover 12 of the battery mounting recess 10. The image recognition device and the control unit operate to correct the position of the movable rail 230. The grasping means 240, which is installed on the lower end of the movable rail 230, moves to be positioned on the same vertical line with the battery mounted on the mounting recess 10 of the bus. This process will now be described in more detail.

The bus 2 enters into the bus stop, stops along the stop line, and opens the opening/closing cover 12 of the battery mounting recess 10. Then, the battery mounted on the battery mounting recess 10 is positioned on the same vertical line near the grasping means 240 of the movable rail 230. The image recognition device transmits the corresponding image to the control unit to correct the position of the movable rail 230.

That is, the CCD camera takes an image of the battery mounting recess 10 and the grasping means 240 of the movable rail 230, which are not on the same vertical line, and transmits the image to the image information processing unit. The calculation unit calculates coordinate values of the photographed position and the absolute position, in which the grasping means 240 of the movable rail 230 currently lies, and transmits them to the control unit. The control unit applies an operating signal so that the variable guide rail 220 and the movable rail 230 are moved by the driving means to the corrected positions based on the transmitted coordinate values. As a result, the battery mounted on the battery mounting recess 10 of the bus and the grasping means 240 of the movable rail 230 are corrected to be positioned on the same vertical line.

That is, when the control unit applies a driving signal to the driving means, the variable guide rail 220 moves along X-axis or Y-axis along the pair of fixed guide rails 210, and the movable rail 230 moves along Y-axis or X-axis along the variable guide rail 220. As a result, the grasping means 240 installed on the lower end of the movable rail 230 is positioned to coincide with the battery mounting recess 10 of the bus (i.e. position correction is made).

After the variable guide rail 220 and the movable rail 230 move so that the grasping means 240 of the movable rail 230 is positioned on the same vertical line with the battery mounted on the battery mounting recess 10 of the bus, as described above, the grasping means 240 of the movable rail 230 descends, grasps the battery, and ascends. The grasping means 240 moves to a vacant battery stand 250, among the battery stands 250 of the horizontal frame 120, under the control of the control unit and seats the discharged battery thereon. The grasping means 240 grasps a fully-charged battery under the control of the control unit, in the same manner as described above, moves to the battery mounting recess 10 of the bus, and mounts the battery thereon. The battery of the bus 2 is automatically exchanged in this manner.

Figure 7:
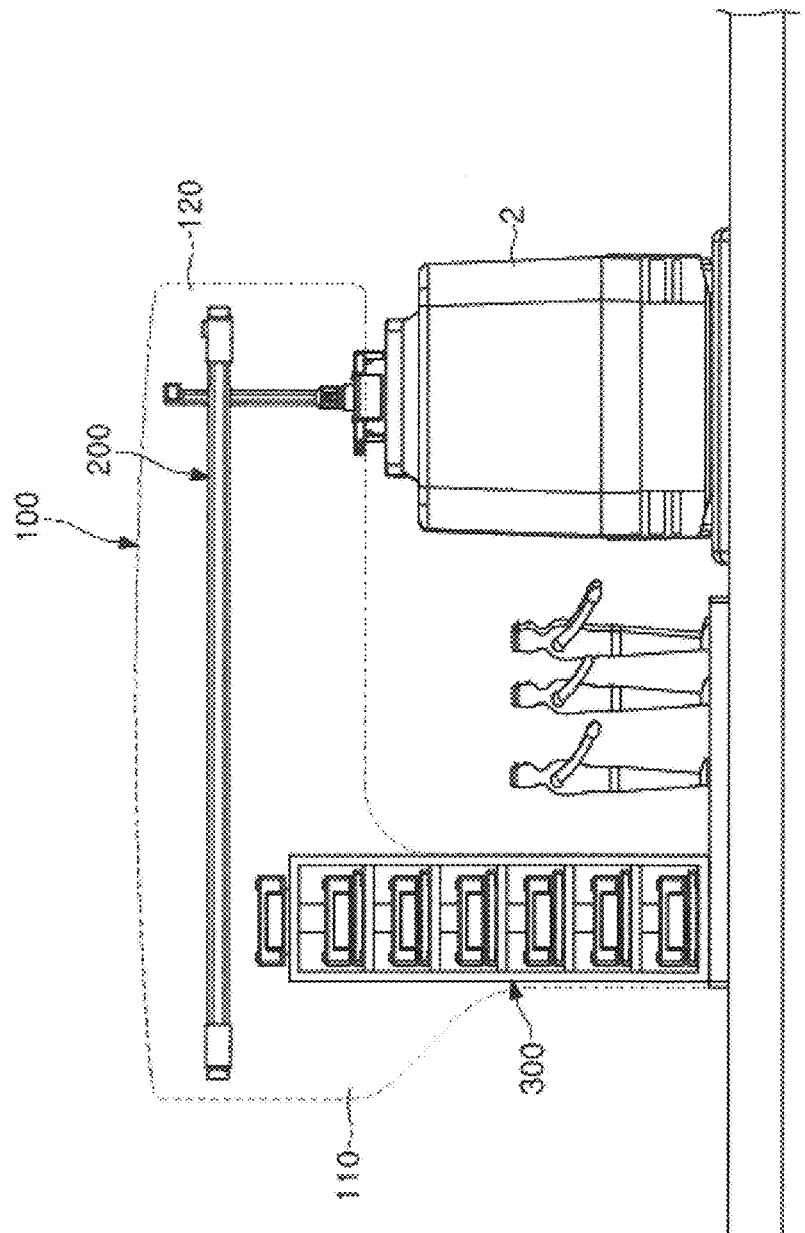
FIG. 7 is a front view of FIG. 1 according to a second embodiment of the present invention.
Figure 8:
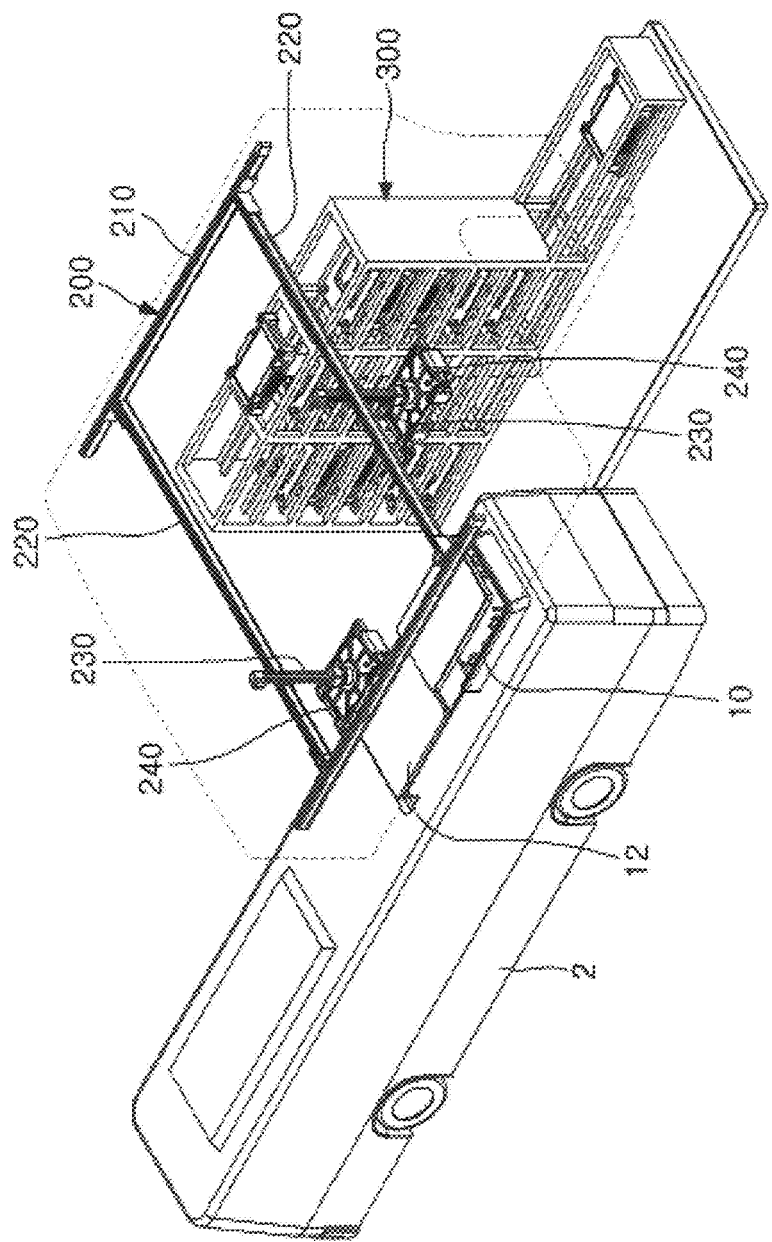
FIG. 8 illustrates internal configuration and operational relationship of a system for automatically exchanging batteries according to the second embodiment of the present invention.
Figure 9:
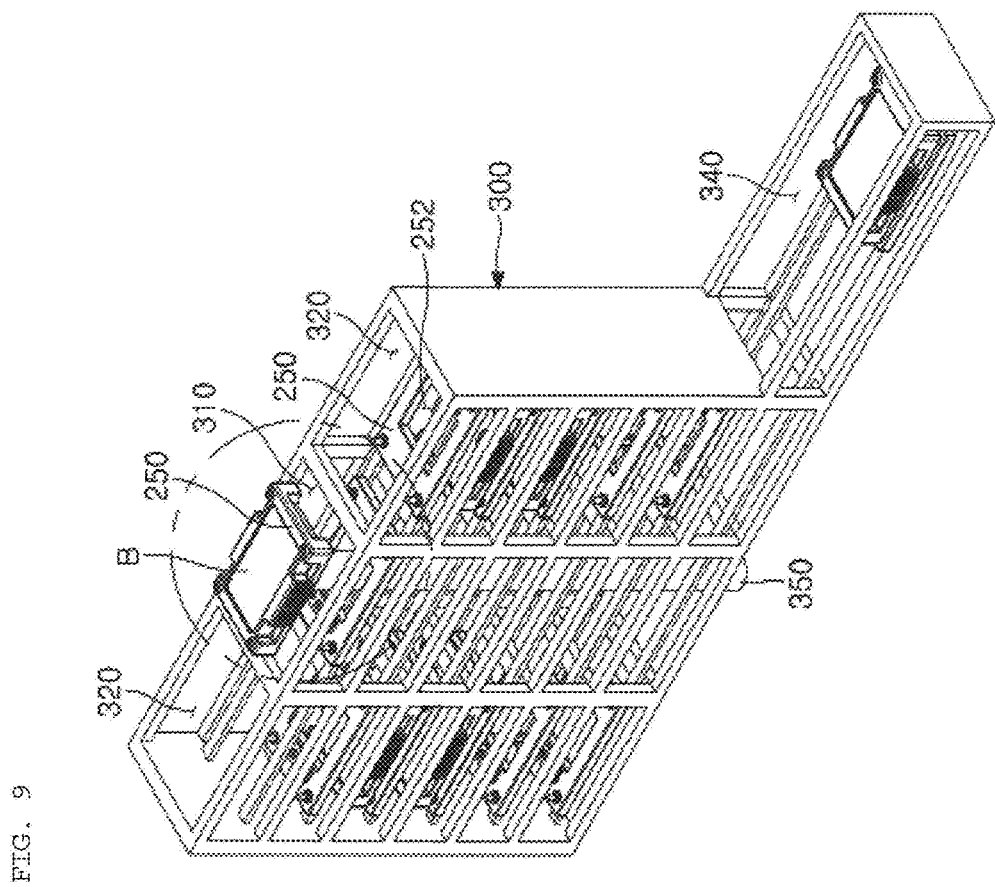
FIG. 9 is a perspective view solely magnifying the loader shown in FIG. 8.
Figure 10:
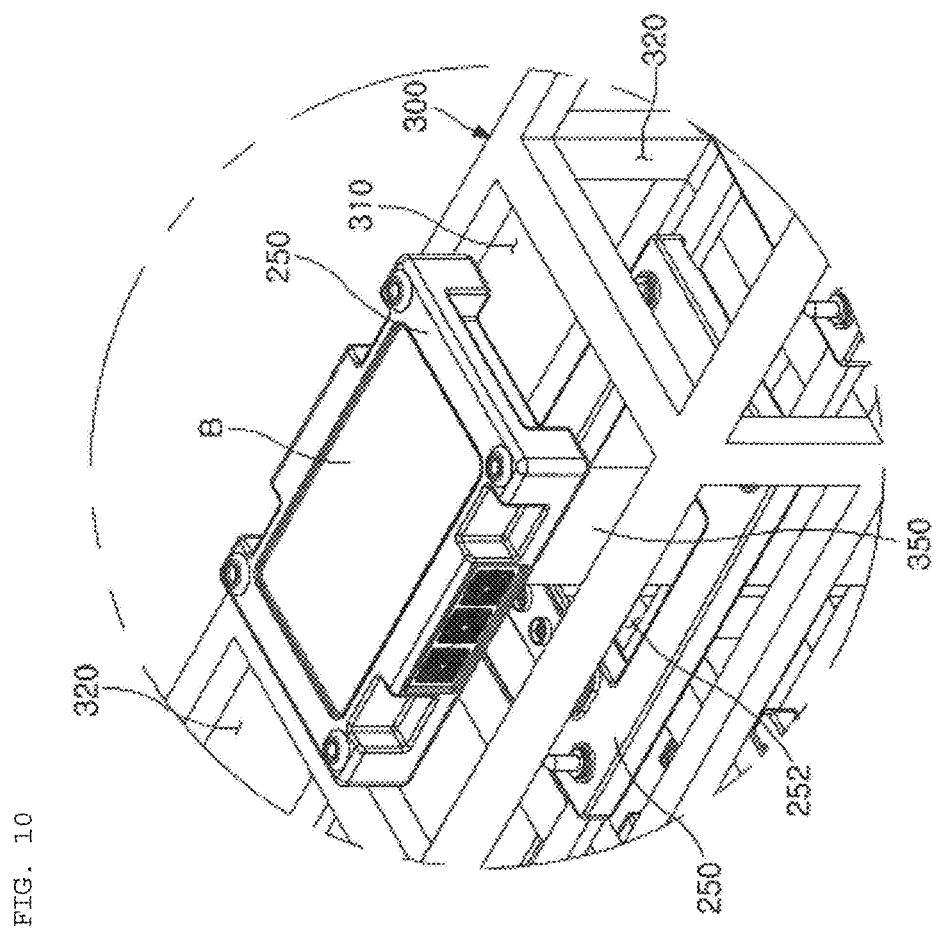
FIG. 10 is a partially magnified perspective view of FIG. 9.

FIG. 7 is a front view of FIG. 1 according to a second embodiment of the present invention; FIG. 8 illustrates internal configuration and operational relationship of a system for automatically exchanging batteries according to the second embodiment of the present invention; FIG. 9 is a perspective view solely magnifying the loader shown in FIG. 8; and FIG. 10 is a partially magnified perspective view of FIG. 9.

Referring to FIGS. 7-10, a system for automatically exchanging batteries according to the second embodiment of the present invention is identically applied to the above-mentioned bus stop (or a specific battery exchange station) shown in FIGS. 1 and 2. That is, a lifting/lowering frame 100, which has a horizontal frame 120 and a vertical frame 110 arranged in an approximately L-shaped configuration, is installed at such a bus stop.

According to the second embodiment of the present invention, the vertical frame 110 has a loader 300 formed in the longitudinal direction and provided with loading space units 310 and 320 of multiple tiers and multiple columns. Each of the loading space units 310 and 320 of the loader 300 has a battery stand 250 installed thereon and adapted to slide horizontally to a different loading space unit of the same tier.

The number of tiers of the loading space units 310 and 320 is not specifically limited, but the number of columns is preferably three. This is because battery stands 250 arranged on loading space units 320 of the left and right columns of the loading space units 310 of the center column need to slide to the loading space units 310 of the center column.

Particularly, among the loading space units 310 and 320 of three columns and multiple tiers, the loading space units 310 of the center column have no separate battery stands arranged thereon, but the loading space units 320 of the left and right columns solely have battery stands 250 arranged thereon, so that the battery stands 250 arranged on the loading space units 320 of the left and right columns horizontally move to the loading space units 310 of the center column in response to electric signals.

Respective loading space units 310 and 320 have upward/downward openings. Specifically, the loading space units 310 of the center column necessarily have upward/downward openings, but the loading space units 320 of the left and right columns may either have openings or be sealed.

The battery stands 250, which are adapted to mount batteries B and arranged on the loading space units 320 to slide horizontally, also have through-holes 252 formed in central areas.

The loader 300 has a lifting/lowering rod 350 adapted to ascend/descend vertically through the loading space units 310 of the center column and lift/lower a battery B mounted on a battery stand 250 positioned in a loading space unit of the center column.

The loader 300 has a receiving space unit 340 formed near the lowest one of loading space units 320 of either left or right column so that a battery stand loaded with a fully-charged battery is supplied to a vacant loading space unit 320 of the loader 300, or a battery stand loaded with a discharged battery is recovered.

According to the second embodiment of the present invention, which has the above-mentioned construction, respective loading space units 310 and 320 of the loader 300, as well as the receiving space unit 340 and the lifting/lowering rod 350, are circuit-connected to the above-mentioned control unit so that, when electric signals are applied to start operation, battery stands 250 arranged on respective loading space units 310 and 320 are moved horizontally, the battery stands 250 are moved horizontally to the receiving space unit 340 and the loading space units 310 and 320, and the lifting/lowering rod 350 is lifted/lowered, as will be described later in detail.

The horizontal frame 120 has a pair of fixed guide rails 210 installed on front and rear upper portions, respectively, in parallel horizontally and a variable guide rail 220 installed to move horizontally in the transverse direction along the fixed guide rails 210.

A movable rail 230 is installed on the variable guide rail 220 in the longitudinal direction and adapted to ascend/descend with regard to the variable guide rail 220 and move horizontally in the longitudinal direction along the variable guide rail 220. A grasping means 240 is installed on the lower end of the movable rail 230 to grasp a battery.

Although only one set of the variable guide rail 220, the movable rail 230, and the grasping means 240 may be sufficient, it is preferred to provide two sets of them in parallel so that a process of picking up a discharged battery mounted on the battery mounting recess 10 of the bus 2 and a process of picking up a fully-charged battery from the loader 300 can proceed alternately.

Reference numeral 200 in the drawings refers to the fixed guide rails 210, the variable guide rail 220, the movable rail 230, and the grasping means 240 as a whole, which constitute a battery exchange system.

Those skilled in the art can understand that, although it has been assumed in the description of the second embodiment of the present invention that a pair of fixed guide rails 210 are installed on front and rear upper portions of the horizontal frame 120, respectively, in parallel horizontally, and the variable guide rail 220 is installed in the longitudinal direction with regard to the fixed guide rails 210, it is also possible to install a pair of fixed guide rails 210 on left and right upper portions of the horizontal frame 120, respectively, in parallel and install a variable guide rail 220 in the transverse direction with regard to the fixed guide rails 210.

According to the second embodiment of the present invention, the vertical frame 110 provided with a loader 300 having a plurality of battery stands 250 loaded thereon, the fixed guide rails 210, the variable guide rail 220, and the movable rail 230 are fixed at a specific location. However, the location of a bus 2 entering the bus stop is variable, making precise position control impossible. This means that it is very difficult to always position the grasping means 240 of the movable rail 230 on the same vertical line with a battery, which is seated on the mounting recess of the bus, according to a preset absolute position.

More specifically, a bus could be stopped at a preset location along a guide stop line and positioned in an area for battery exchange, but it is impossible to stop the bus at the accurately set location (where the grasping means 240 of one of the movable rails 230 is set). Therefore, it is important for the movable rail 230 to automatically find the position of the battery mounted on the battery mounting recess 10 of the bus 2 and be aligned on the same vertical line.

Therefore, the second embodiment of the present invention employs an image recognition device, as shown in FIG. 11, to detect the positional difference between the grasping means 240 of the movable rail 230 and the battery mounted on the battery mounting recess 10 of the bus and transmit position correction data to the control unit so that, by detecting the accurate position on the same line, the grasping means 240 of the movable rail 230 is positioned on the same vertical line with the battery of the bus. The operation of the image recognition device according to the second embodiment of the present invention is substantially the same as in the case of the first embodiment described above, and repeated descriptions will be omitted herein.

The operational relationship regarding the system for automatically exchanging electric vehicle batteries according to the second embodiment of the present invention, which has the above-mentioned construction, will now be described.

When a bus enters into a bus stop, while fully-charged batteries or fully-charged and discharged batteries are mounted on the loader 300 of the vertical frame 110, i.e. on the battery stands 250 of the loading space units 320 of the left and right columns of the loader 300, and inputs a signal for battery exchange, a process of exchanging the discharged battery with a fully-charged battery begins.

To be more specific, the bus 2 enters into the bus stop and stops along the stop line. The bus then inputs a battery exchange signal and opens the opening/closing cover 12 of the battery mounting recess 10. The image recognition device and the control unit operate to correct the position of one of the movable rails 230. The grasping means 240, which is installed on the lower end of the movable rail 230, moves to be positioned on the same vertical line with the battery mounted on the mounting recess 10 of the bus. This process will now be described in more detail.

The bus 2 enters into the bus stop, stops along the stop line, and opens the opening/closing cover 12 of the battery mounting recess 10. Then, the battery mounted on the battery mounting recess 10 is positioned on the same vertical line near the grasping means 240 of one of the movable rails 230. The image recognition device transmits the corresponding image to the control unit to correct the position of the movable rail 230.

That is, the CCD camera takes an image of the battery mounting recess 10 and the grasping means 240 of the movable rail 230, which are not on the same vertical line, and transmits the image to the image information processing unit. The calculation unit calculates coordinate values of the photographed position and the absolute position, in which the grasping means 240 of the movable rail 230 currently lies, and transmits them to the control unit. The control unit applies an operating signal so that the variable guide rail 220 and the movable rail 230 are moved by the driving means to the corrected positions based on the transmitted coordinate values. As a result, the battery mounted on the battery mounting recess 10 of the bus and the grasping means 240 of the movable rail 230 are corrected to be positioned on the same vertical line.

That is, when the control unit applies a driving signal to the driving means, one of the variable guide rails 220 moves along X-axis or Y-axis along the pair of fixed guide rails 210, and the movable rail 230 moves along Y-axis or X-axis along the variable guide rail 220. As a result, the grasping means 240 installed on the lower end of the movable rail 230 is positioned to coincide with the battery mounting recess 10 of the bus (i.e. position correction is made).

After the variable guide rail 220 and the movable rail 230 move so that the grasping means 240 of the movable rail 230 is positioned on the same vertical line with the battery mounted on the battery mounting recess 10 of the bus, the grasping means 240 of the movable rail 230 descends, grasps the battery, and ascends. Then, the grasping means 240 moves horizontally along X-axis and Y-axis to the upper portion of the lifting/lowering rod 350 of the loader 300.

The other variable guide rail 220 moves horizontally along X-axis and Y-axis, picks up a fully-charged battery, which has been lifted/lowered by the lifting/lowering rod 350 of the loader 300, and again moves horizontally along X-axis and Y-axis to be positioned on the same vertical line with the battery mounting recess 10 of the bus 2.

Therefore, the grasping means, which grasps the discharged battery, and the movable rail descend along Z-axis and seat the discharged battery on the lifting/lowering rod 350 of the loader 300, and the grasping means, which grasps the fully-charged battery, and the movable rail also descend along Z-axis and seat the fully-charged battery on the battery mounting recess 10 of the bus 2. The discharged battery and the fully-charged battery are thus exchanged.

A process of transferring a fully-charged battery from the loader 300 will be described briefly.

A battery stand 250 positioned on a loading space unit selected from the loading space units 320 of the left and right columns of the loader 300 moves horizontally, in response to an electric signal, to be positioned on a loading space unit 310 of the center column. The lifting/lowering rod 350 then ascends and moves through the openings of the loading space units 310 of the center column and the through-holes 252 of the battery stands 250 so that only the fully-charged battery is lifted to the upper portion of the center-column loading space units 310.

In this state, the grasping means of one of the movable rails supplies the fully-charged battery, and the grasping means of the other movable rail recovers the discharged battery. When the discharged battery is seated on the lifting/lowering rod 350, it descends again in response to an electric signal to be seated on a battery stand 250, from which the fully-charged battery is detached, and the battery stand 250 moves horizontally from the center-column loading space unit 310 to the original left/right-column loading space unit 320.

The horizontal movement of the battery stands 250 from the left/right-column loading space units 320 to the center-column loading space units 310 can be implemented by any construction known in the art, such as a driving means (e.g. roller, timing belt), pushing means (e.g. cylinder), and detailed description thereof will be omitted herein.

When a discharged battery is mounted on a left/right-column loading space unit 320 of the loader 300, the control unit applies an electric signal to horizontally move the battery stand 250 loaded with the discharged battery, lift/lower it by the lifting/lowering rod 350 to send it to the receiving space unit 340, receive a fully-charged battery from the receiving space unit 340, and move it to the left/right-column loading space unit 320.

It is also possible that, when a discharged battery is mounted on a loading space unit 320 of the loader 300, the discharged battery is positioned at the upper portion of the center-column loading space units 310 through horizontal movement of the battery stand 250 and upward movement of the lifting/lowering rod 350, and is exchanged with a fully-charged battery, which is then mounted on a left/right-column loading space unit 320 of the loader 300.

Technical ideas described in connection with embodiments of the present invention can be implemented independently or in combination. Although embodiments of the present invention have been described and illustrated, they are intended to be exemplary only, and various modifications and equivalents thereof will be obvious to those skilled in the art. The technical scope of the present invention is to be defined by the accompanying claims.

The invention claimed is:

1. A system for automatically exchanging a battery of an electric vehicle, an electric battery being mounted on a side of an upper portion of the vehicle, the system comprising:
   a horizontal frame of a predetermined area formed at a location higher than the electric vehicle;
   a plurality of battery stands formed on a bottom surface of the horizontal frame at a predetermined interval;
   a pair of fixed guide rails arranged and installed on front and rear sides or left and right sides of the horizontal frame, respectively;
   a variable guide rail adapted to move horizontally along X-axis or Y-axis along the fixed guide rails;
   a movable rail adapted to move horizontally along Y-axis or X-axis along the variable guide rail and ascend/descend vertically; and
   a grasping means installed on a lower end of the movable rail and adapted to pick up a battery of the electric vehicle or a battery seated on the battery stand and exchange each other.

2. The system as claimed in claim 1, wherein, when there are n battery stands, at least (n−1) discharged batteries or fully-charged batteries are seated on the battery stands.

3. The system as claimed in claim 1, further comprising:
   a stop monitoring sensor unit adapted to sense whether the electric vehicle has stopped at a stop line or not;
   an image sensing device adapted to sense whether a battery mounting recess is positioned in a movement area of the movable rail when the electric vehicle stopped and sense in what range the battery mounting recess is positioned from an absolute position of the movable rail; and
   a control unit adapted to apply an operating signal to drive the variable guide rail and the movable rail, based on a sensing signal from the image sensing device, so that the grasping means of the movable rail is positioned on an identical vertical line with the battery mounting recess.

4. The system as claimed in claim 3, wherein the image sensing device comprises:
   a CCD camera adapted to take images to determine whether the battery mounting recess is in a movement area of the movable rail or not when the electric vehicle stopped;
   an image information processing unit adapted to receive an image signal from the CCD camera and process the image signal;
   a memory unit adapted to store a reference value for position correction of the movable rail; and
   a calculation unit adapted to calculate a position correction value based on the reference value stored in the memory unit and a stop position of the electric vehicle detected by the image information processing unit, and
   the control unit is adapted to apply an operating signal to the driving means, based on the position correction value calculated by the calculation unit, so as to drive positions of the variable guide rail and the movable rail from absolution positions to corrected positions.

5. The system as claimed in claim 4, wherein at least two CCD cameras are positioned diagonally to minimize errors occurring during image recognition by the image recognition device.

6. The system as claimed in claim 3, wherein each battery stand is supplied with electricity to charge a discharged battery.

7. The system as claimed in claim 6, wherein the control unit is circuit-connected to respective battery stands and adapted to determine whether a battery is seated or not, determine whether respective batteries seated on the battery stands are fully charged or not, and control the driving means of the movable rail and the variable guide rail so that a discharged battery picked up from the electric vehicle is transferred to an empty battery stand and a fully-charged battery is solely transferred to the electric vehicle.

8. A system for automatically exchanging a battery of an electric vehicle, an electric battery being mounted on a side of an upper portion of the vehicle, the system comprising:
   a loader formed at a location higher than the electric vehicle, the loader having loading space units of multiple tiers and multiple columns;
   battery stands arranged on respective loading space units of the loader and adapted to move horizontally to a loading space unit of a different column;
   a pair of fixed guide rails arranged and installed on front and rear sides or left and right sides, respectively, with regard to an upper portion of the loader and the upper portion of the electric vehicle;
   a variable guide rail adapted to move horizontally along X-axis or Y-axis along the fixed guide rails;
   a movable rail adapted to move horizontally along Y-axis or X-axis along the variable guide rail and ascend/descend vertically; and
   a grasping means installed on a lower end of the movable rail and adapted to pick up a battery of the electric vehicle or a battery transferred to the upper portion of the loader and exchange each other.

9. The system as claimed in claim 8, wherein the loader has loading space units of multiple tiers and three columns, the loading space units of the center column have upward/downward openings so that a lifting/lowering rod ascends/descends upwards/downwards through the openings, and battery stands loaded with fully-charged batteries are arranged on the loading space units of the left and right columns, which are positioned on both sides of the loading space units of the center column, and adapted to slide horizontally.

10. The system as claimed in claim 9, wherein through-holes are formed on the battery stands so that the lifting/lowering rod can pass.

11. The system as claimed in claim 9, wherein a receiving space unit is formed near a lowest one of the loading space units of the left or right column so that a battery stand loaded with a fully-charged battery or a discharged battery is received in a loading space unit of the loader.

12. The system as claimed in claim 8, further comprising:
   a stop monitoring sensor unit adapted to sense whether the electric vehicle has stopped at a stop line or not;
   an image sensing device adapted to sense whether a battery mounting recess is positioned in a movement area of the movable rail when the electric vehicle stopped and sense in what range the battery mounting recess is positioned from an absolute position of the movable rail; and
   a control unit adapted to apply an operating signal to drive the variable guide rail and the movable rail, based on a sensing signal from the image sensing device, so that the grasping means of the movable rail is positioned on an identical vertical line with the battery mounting recess.

* * * * *